(12) United States Patent
Hong et al.

(10) Patent No.: US 7,215,386 B2
(45) Date of Patent: May 8, 2007

(54) MULTI-DOMAIN LIQUID CRYSTAL DISPLAY AND A THIN FILM TRANSISTOR SUBSTRATE OF THE SAME

(75) Inventors: Sung-Kyu Hong, Suwon (KR);
Hee-Seop Kim, Kyungki-do (KR);
Kyoung-Ju Shin, Yongin (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 67 days.

(21) Appl. No.: 10/509,207

(22) PCT Filed: Jul. 22, 2002

(86) PCT No.: PCT/KR02/01372

§ 371 (c)(1),
(2), (4) Date: Sep. 24, 2004

(87) PCT Pub. No.: WO03/102681

PCT Pub. Date: Dec. 11, 2003

(65) Prior Publication Data

US 2005/0151893 A1   Jul. 14, 2005

(30) Foreign Application Priority Data

Apr. 9, 2002   (KR) .............................. 2002-19244

(51) Int. Cl.
G02F 1/1368  (2006.01)
G02F 1/1343  (2006.01)
(52) U.S. Cl. .................... 349/43; 349/38; 349/129; 349/143; 349/152; 349/178

(58) Field of Classification Search .................. 349/38, 349/43, 128, 129, 130, 139, 167, 177, 42, 349/144, 146, 152, 178; 257/59, 72; 345/92
See application file for complete search history.

(56) References Cited

U.S. PATENT DOCUMENTS

| 6,278,503 B1 | 8/2001 | Nishikawa |
| 6,407,791 B1 * | 6/2002 | Suzuki et al. ................ 349/129 |
| 6,650,390 B2 * | 11/2003 | Sakamoto et al. .......... 349/143 |
| 2001/0019392 A1 | 9/2001 | Sakamoto |

FOREIGN PATENT DOCUMENTS

| KR | 1999-0088080 | 12/1999 |
| KR | 2000-0035709 | 6/2000 |

\* cited by examiner

*Primary Examiner*—Toan Ton
*Assistant Examiner*—Tai Duong
(74) *Attorney, Agent, or Firm*—F. Chau & Associates, LLC

(57) ABSTRACT

Gate lines are formed on an insulating substrate, and data lines crossing the gate lines are formed. The gate lines and the data lines are insulated from each other and intersect each other to define pixel areas. A thin film transistor including three terminals of a gate electrode, a source electrode and a drain electrode is formed in each pixel area. A direction control electrode and a pixel electrode are also formed in each pixel area. The thin film transistor switches the direction control electrode. The pixel electrode is electronically floating and capacitively coupled with the direction control electrode.

13 Claims, 10 Drawing Sheets

Simulation Parameter
TFT W/L=30μm/3.5μm,
$C_{DCE\_PIXEL}$=2.0pF, 2.5pF, 3.0pF (Split)=$C_{DP}$
$C_{DCE\_COM}$=0.01pF
$C_{ST}$ =0.02pF
$C_{LC}$ =0.3pF
$R_{LC}$ =30T
Gate & Data R,C Load=17" With reference to center

MULTI-DOMAIN LIQUID CRYSTAL DISPLAY AND A THIN FILM TRANSISTOR SUBSTRATE OF THE SAME

BACKGROUND OF THE INVENTION (a) Field of the Invention

The present invention relates to a liquid crystal display, and in particular, vertically-aligned liquid crystal display having a pixel region including a plurality of domains for wide viewing angle.

(b) Description of the Related Art

A typical liquid crystal display (LCD) includes an upper panel provided with a common electrode and an array of color filters, a lower panel provided with a plurality of thin film transistors (TFTs) and a plurality of pixel electrodes, and a liquid crystal layer is interposed therebetween. The pixel electrodes and the common electrode are applied with electric voltages and the voltage difference therebetween causes electric field. The variation of the electric field changes the orientations of liquid crystal molecules in the liquid crystal layer and thus the transmittance of light passing through the liquid crystal layer. As a result, the LCD displays desired images by adjusting the voltage difference between the pixel electrodes and the common electrode.

The LCD has a major disadvantage of its narrow viewing angle, and several techniques for increasing the viewing angle have been developed. Among these techniques, the provision of a plurality of cutouts or a plurality of projections on the pixel electrodes and the common electrode opposite each other along with the vertical alignment of the liquid crystal molecules with respect to the upper and the lower panels is promising.

The cutouts provided both at the pixel electrodes and the common electrode give wide viewing angle by generating fringe field to adjust the tilt directions of the liquid crystal molecules.

The provision of the projections both on the pixel electrode and the common electrode distorts the electric field to adjust the tilt directions of the liquid crystal molecules.

The fringe field for adjusting the tilt directions of the liquid crystal molecules to form a plurality of domains is also obtained by providing the cutouts at the pixel electrodes on the lower panel and the projections on the common electrode on the upper panel.

Among these techniques for widening the viewing angle, the provision of the cutouts has problems that an additional mask for patterning the common electrode is required, an overcoat is required for preventing the effect of the pigments of the color filters on the liquid crystal material, and severe disclination is generated near the edges of the patterned electrode. The provision of the projections also has a problem that the manufacturing method is complicated since it is required an additional process step for forming the projections or a modification of a process step. Moreover, the aperture ratio is reduced due to the projections and the cutouts.

SUMMARY OF THE INVENTION

It is a motivation of the present invention to provide a liquid crystal display manufactured by simple process and ensuring stable multi-domains.

This and other motivations may be achieved by a liquid crystal display with a direction control electrode. A pixel electrode is capacitively coupled with the direction control electrode, and a switching thin film transistor is connected to the direction control electrode.

A thin film transistor array panel is provided, which includes: an insulating substrate; a gate wire formed on the insulating substrate; a data wire formed on the insulating substrate and intersecting the gate wire in an insulating manner; a thin film transistor electrically connected to the gate wire and the data wire; a direction control electrode electrically connected to a terminal of the thin film transistor; and a pixel electrode electrically insulated from the direction control electrode and having a cutout proceeding along the direction control electrode, the pixel electrode being electrically floating.

Preferably, the thin film transistor array panel further includes a storage electrode wire intersecting the data wire and forming a storage capacitor in association with the pixel electrode.

Another thin film transistor array panel is provided, which includes: an insulating substrate; a gate wire formed on the insulating substrate and including a gate electrode and a gate line; a gate insulating layer formed on the gate wire; a semiconductor layer formed on the gate insulating layer; a data wire including a data line formed on the semiconductor layer and intersecting the gate line, a source electrode connected to the data line, and a drain electrode facing the source electrode; a direction control electrode connected to the drain electrode; a passivation layer formed on the data wire and the direction control electrode; and a pixel electrode formed on the passivation layer with an cutout and including a cutout overlap the direction control electrode at least in part.

Preferably, the thin film transistor array panel further includes: a gate pad connected to one end of the gate line; a data pad connected to one end of the data line; a subsidiary gate pad formed on the passivation layer and connected to the gate pad through a contact hole; and a subsidiary data pad formed on the passivation layer and connected to the data pad through a contact hole. It is preferable that the cutout of the pixel electrode includes a plurality of X-shaped portions and a plurality of rectilinear portions, and the direction control electrode overlaps the X-shaped portions. The semiconductor layer may include a data-line semiconductor located under the data line, and a channel semiconductor located under the source and the drain electrodes, and the semiconductor layer may include a direction control electrode semiconductor located under the direction control electrode along the direction control electrode. The thin film transistor array panel further includes, preferably, a metallic piece formed of the same layer as the gate wire and placed under the direction control electrode along the direction control electrode.

A liquid crystal display according to an embodiment of the present invention includes: a first insulating substrate; a gate wire formed on the first insulating substrate; a data wire formed on the first insulating substrate and intersecting the gate wire in an insulating manner to define a pixel area; a direction control electrode formed in the pixel area defined by the intersection of the gate wire and the data wire; a thin film transistor connected to the gate wire, the data wire, and the direction control electrode; an electrically floating pixel electrode formed in the pixel area, electrically insulated from the direction control electrode connected to the thin film transistor, and having a cutout proceeding along the direction control electrode; a second insulating substrate facing the first insulating substrate; a common electrode formed on the second insulating substrate; and a liquid crystal layer interposed between the first substrate and the second insulating substrate.

The liquid crystal layer has negative dielectric anisotropy and liquid crystal molecules in the liquid crystal layer are aligned perpendicular to the first and the second substrates. Alternatively, the liquid crystal layer has positive dielectric anisotropy and liquid crystal molecules in the liquid crystal layer are aligned parallel to the first and the second substrates. The liquid crystal display may further include a storage electrode wire formed on the first substrate and forming a storage capacitor in association with the pixel electrode. The common electrode and the storage electrode wire are preferably supplied with the same voltage, and voltage difference between the pixel electrode and the common electrode $V_{PC}$ is given by:

$$V_{PC} = \frac{C_{DP}}{C_{DP} + C_{LC} + C_{ST}} V_{DC},$$

where $C_{DP}$ indicates capacitance between the direction control electrode and the pixel electrode, $C_{LC}$ indicates capacitance between the pixel electrode and the common electrode, $C_{ST}$ indicates capacitance between the pixel electrode and the storage electrode wire, and $V_{DC}$ is the voltage difference between the direction control electrode and the common electrode.

DETAILED DESCRIPTION OF PREFERRED EMBODIMENTS

Now, LCDs according to embodiments of this invention will be described in detail with reference to the accompanying drawings.

Figure 1:
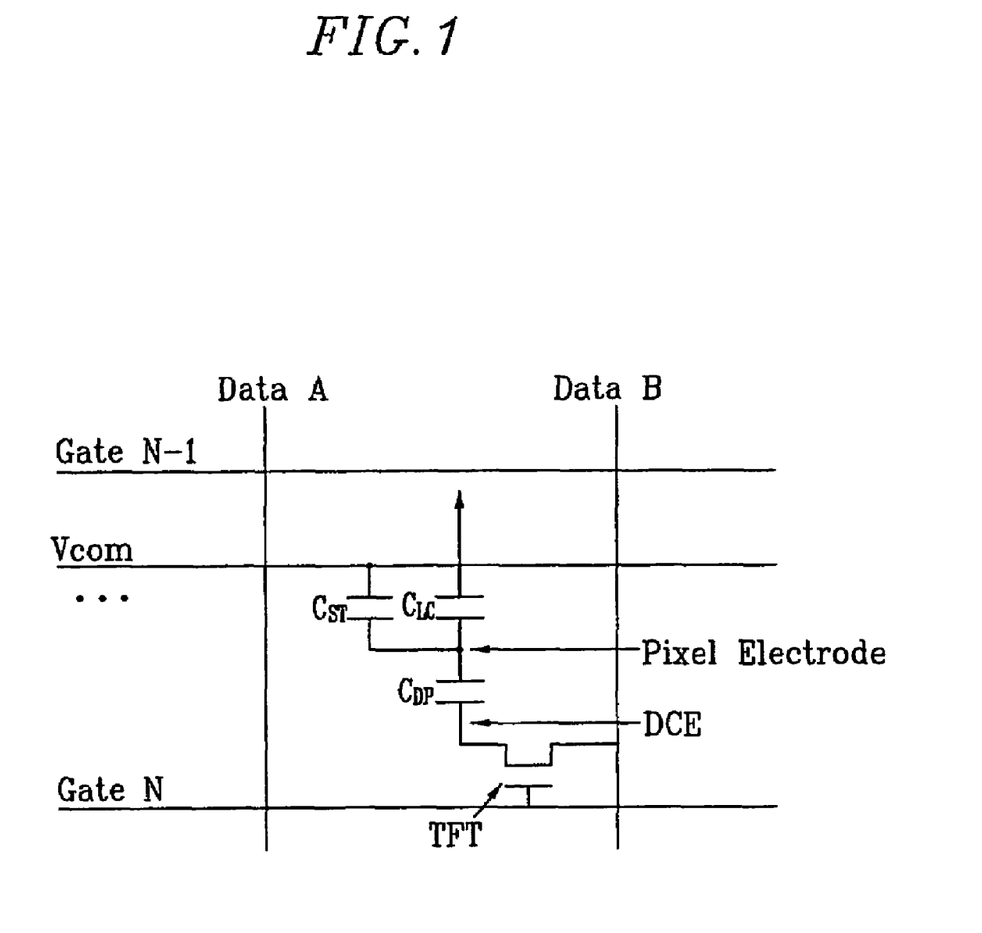
FIG. 1 is an equivalent circuit diagram of an LCD according to an embodiment of the present invention.

FIG. 1 is an equivalent circuit diagram of an LCD according to an embodiment of the present invention.

An LCD according to an embodiment of the present invention includes a TFT array panel, a color filter array panel opposite the TFT array panel, and a liquid crystal layer interposed therebetween. The TFT array panel is provided with a plurality of gate lines and a plurality of data lines intersecting each other to define a plurality of pixel areas, and a plurality of storage electrode lines extending parallel to the gate lines. Each pixel area is provided with a TFT including a gate electrode connected to one of the gate lines, a source electrode connected to one of the data lines, and a drain electrode connected to one of a plurality of direction control electrodes (DCEs).

The DCE and the pixel electrode are capacitively coupled, and the capacitor therebetween or its capacitance is represented by $C_{DP}$. The pixel electrode and a common electrode provided on the color filter array panel form a liquid crystal capacitor, and the liquid crystal capacitor or its capacitance is represented by $C_{LC}$. The pixel electrode and a storage electrode connected to one of the storage electrode lines form a storage capacitor, and the storage capacitor or its capacitance is represented by $C_{ST}$.

The present invention makes the pixel electrode floating and capacitively coupled with the DCE. The relation between the voltages of the DCE and the pixel electrode can be expressed by Equation 1, $$V_{PC} = \frac{C_{DP}}{C_{DP} + C_{LC} + C_{ST}} V_{DC}, \quad (1)$$

where $C_{DP}$ indicates the capacitance between the DCE and the pixel electrode, $C_{LC}$ is the capacitance between the pixel electrode and the common electrode, $C_{ST}$ is the capacitance between the pixel electrode and the storage electrode wire, $V_{PC}$ is the voltage difference between the pixel electrode and the common electrode, and $V_{DC}$ is the voltage difference between the DCE and the common electrode.

The derivation of Equation 1 will be now described in detail.

As shown in FIG. 1, the capacitors $C_{ST}$ and $C_{LC}$ are connected in parallel, and the capacitor $C_{DP}$ is connected to the capacitors $C_{ST}$ and $C_{LC}$ in series. Therefore, the voltage across the capacitors $C_{ST}$ and $C_{LC}$, that is, the voltage difference $V_{PC}$ between the pixel electrode and the common electrode can be expressed by the voltage difference $V_{DC}$ between the DCE and the common electrode according to the voltage distribution law, as indicated in Equation 1.

As shown in the equation 1, the voltage difference $V_{PC}$ is always lower than the voltage $V_{DC}$ by a predetermined ratio, which is determined by the capacitances of the capacitors $C_{DP}$, $C_{ST}$ and $C_{LC}$.

Although the described example applies the common voltage to the storage electrodes wire, a separate voltage may be applied to the storage electrode wire.

Figure 2:
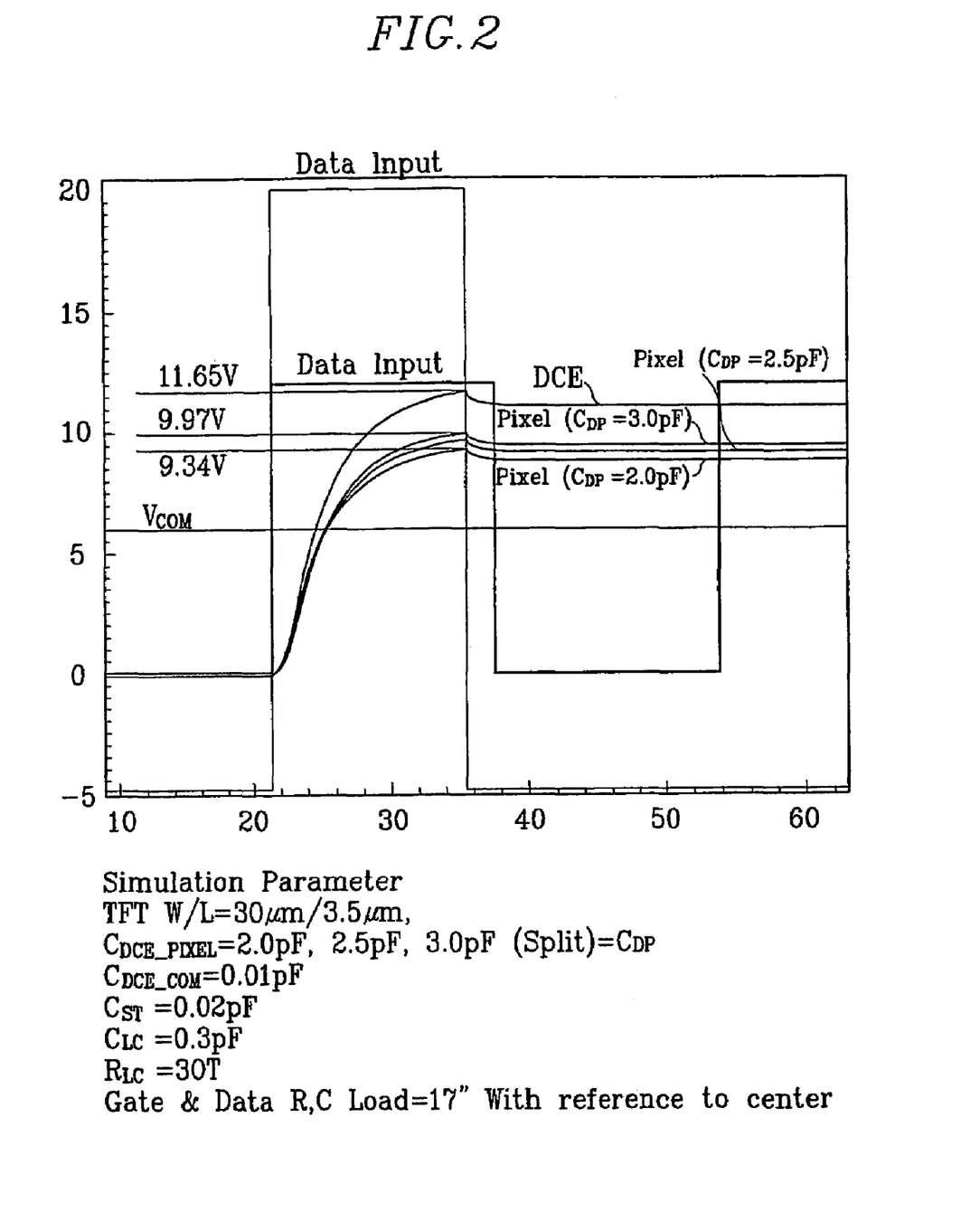
FIG. 2 shows waveforms of the voltage of a pixel electrode and the voltage of a DCE voltage for the capacitance between the pixel electrode and the DCE in an LCD according to an embodiment of the present invention.

FIG. 2 shows waveforms of the voltage $V_{PC}$ of a pixel electrode and the voltage $V_{DC}$ of a DCE voltage $V_{DC}$ for the capacitance between the pixel electrode and the DCE.

FIG. 2 shows that, as expected from Equation 1, the voltage $V_{PC}$ of the pixel electrode is lower than the voltage $V_{DC}$ of the DCE by a predetermined ratio, and the difference between the voltage $V_{DC}$ of the DCE and the voltage $V_{PC}$ of the pixel electrode is varied depending upon the capacitance of the capacitor $C_{DP}$.

When the relation between the voltage $V_{DC}$ of the DCE and the voltage $V_{PC}$ of the pixel electrode is established as expressed by Equation 1, the electric field in the liquid crystal layer is varied by the voltage $V_{DC}$ of the DCE so that the alignment of the liquid crystal molecules can be controlled and thus pretilt of the liquid crystal molecules are also controlled. Although the pixel electrode is floating, the capacitive coupling of the pixel electrode and the DCE gives a voltage to the pixel electrode so that an electric field is generated in the liquid crystal layer, thereby driving the liquid crystal.

Now, a detailed embodiment of the present invention is described with reference to FIGS. 3A and 3B.

Figure 3A:
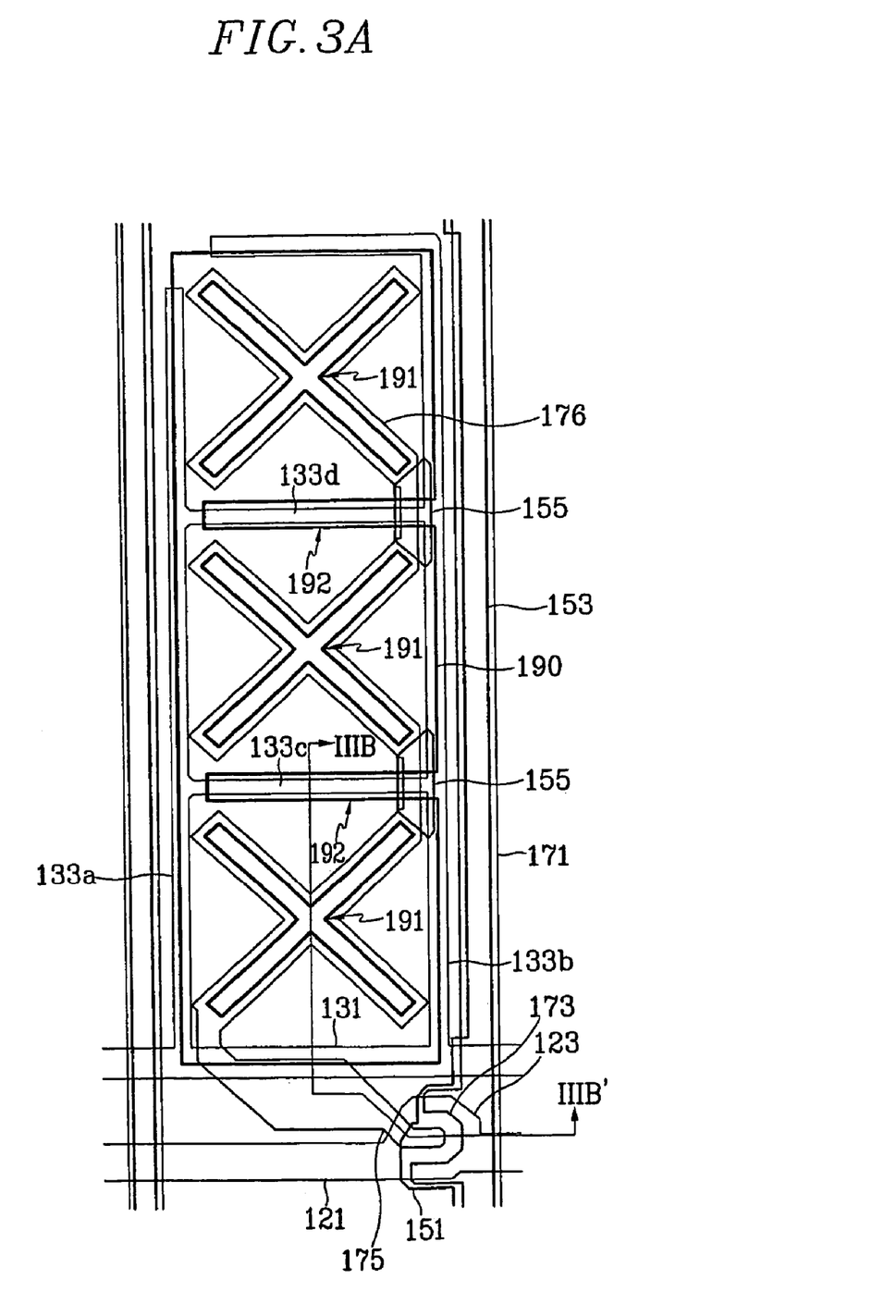
FIG. 3A is a layout view of an LCD according to a first embodiment of the present invention.
Figure 3B:
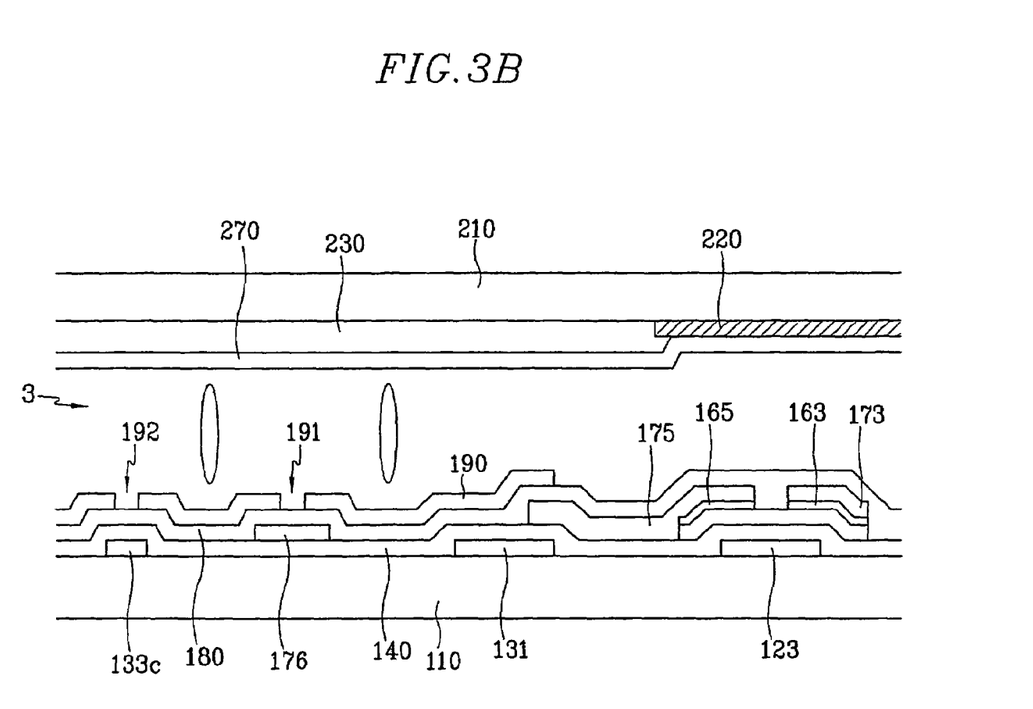
FIG. 3B is a sectional view of the LCD shown in FIG. 3A taken along the line IIIB–IIIB'.

FIG. 3A is a layout view of an LCD according to a first embodiment of the present invention, and FIG. 3B is a sectional view of the LCD shown in FIG. 3A taken along the lines IIIB–IIIB'.

An LCD according to an embodiment of the present invention includes a lower panel, an upper panel facing the lower panel, and a vertically (or homeotropically) aligned liquid crystal layer interposed between the lower panel and the upper panel.

The lower panel will now be described more in detail.

A plurality of gate lines 121 are formed on an insulating substrate 110 and a plurality of data lines 171 are formed thereon. The gate lines 121 and the data lines 171 are insulated from each other and intersect each other to define a plurality of pixel areas.

Each pixel area is provided with a TFT, a DCE and a pixel electrode. The TFT has three terminals, a gate electrode 123, a source electrode 173, and a drain electrode 175, and is provided for switching signals entering the DCE 176. The pixel electrode 190 is electrically floating and capacitively coupled with the DCE 176. The gate electrode 123, the source electrode 173, and the drain electrode 175 of the TFT are connected to corresponding one of the gate lines 121, one of the data lines 171 and the DCE 176, respectively. The DCE 176 is applied with a direction-controlling voltage for controlling the pre-tilts of the liquid crystal molecules to generate a direction-controlling electric field between the DCE 176 and the common electrode 270. The DCE 176 is formed in a step for forming the data lines 171.

The layered structure of the lower panel will be described in detail.

A plurality of gate lines 121 extending substantially in a transverse direction are formed on an insulating substrate 110, and a plurality of gate electrodes 123 are branched from the gate lines 121. A plurality of storage electrode lines 131 and a plurality of sets of first to fourth storage electrodes 133a–133d are also formed on the insulating substrate 110. The storage electrode lines 131 extend substantially in the transverse direction, and the first and the second storage electrodes 133a and 133b extend from the storage electrode line 131 in a longitudinal direction. The third and the fourth storage electrodes 133c and 133d extend in the transverse direction and connect the first storage electrode 133a and the second storage electrode 133b.

The gate wire 121 and 123 and the storage electrode wire 131 and 133a–133d are preferably made of Al, Cr or their alloys, Mo or Mo alloy. If necessary, the gate wire 121 and 123 and the storage electrode wire 131 and 133a–133d include a first layer preferably made of Cr or Mo alloys having excellent physical and chemical characteristics and a second layer preferably made of Al or Ag alloys having low resistivity.

A gate insulating layer 140 is formed on the gate wire 121 and 123 and the storage electrode wire 131 and 133a–133d.

A semiconductor layer 151, 153 and 155 preferably made of amorphous silicon is formed on the gate insulating layer 140 opposite the gate electrodes 123. The semiconductor layer 151, 153 and 155 includes a plurality of channel semiconductors 151 forming channels of TFTs, a plurality of data-line semiconductors 153 located under the data lines 171, and a plurality of intersection semiconductors 155 located near the intersections of DCEs 176 and the storage electrodes 133c and 133d for ensuring insulation therebetween.

An ohmic contact layer 161 and 165 preferably made of silicide or n+hydrogenated amorphous silicon heavily doped with n type impurity is formed on the semiconductor layer 151, 153 and 155.

A data wire 171, 173 and 175 is formed on the ohmic contact layer 161 and 165 and the gate insulating layer 140. The data wire 171, 173 and 175 includes a plurality of data lines 171 extending in the longitudinal direction and intersecting the gate lines 121 to form a plurality of pixels, a plurality of source electrodes 173 branched from the data lines 171 and extending onto portions 163 of the ohmic contact layer, a plurality of data pads (not shown) connected to one ends of the data lines 171 and receiving image signals from an external device, and a plurality of drain electrodes 175 disposed on portions 165 of the ohmic contact layer, located opposite the source electrodes 173 with respect to the gate electrodes 123, and separated from the source electrodes 173.

A plurality of DCEs 176 are formed in the pixel areas defined by the intersections of the gate lines 121 and the data lines 171. Each DCE 176 includes a plurality of X-shaped metal pieces connected to one another and is connected to the drain electrode 175. The data wire 171, 173 and 175 and the DCEs 176 are preferably made of Al, Cr or their alloys, Mo or Mo alloy. If necessary, the data wire 171, 173 and 175 and the DCEs 176 include a first layer preferably made of Cr or Mo alloys having excellent physical and chemical characteristics and a second layer preferably made of Al or Ag alloys having low resistivity.

A passivation layer 180 preferably made of silicon nitride or organic insulator is formed on the data wire 171, 173 and 175.

The passivation layer 180 is provided with a plurality of contact holes (not shown) exposing the data pads, and the passivation layer 180 and the gate insulating layer 140 are provided with a plurality of contact holes (not shown) exposing the gate pads. The contact holes exposing the pads may have various shapes such as polygon or circle. The area of the contact hole is preferably equal to or larger than 0.5 mm×15 μm and not larger than 2 mm×60 μm.

A plurality of pixel electrodes 190 are formed on the passivation layer 180. Each pixel electrode 190 is electrically floating and has a plurality of X-shaped cutouts 191 and a plurality of linear cutouts 192. The X-shaped cutouts 191 overlap the X-shaped portions of the DCE 176 while the linear cutouts 192 overlap the third and the fourth storage electrodes 133c and 133d. The DCE 176 broadly overlaps peripheries of the cutouts 191 as well as the cutouts 191 themselves to form a storage capacitance along with the pixel electrode 190.

Furthermore, a plurality of subsidiary gate pads (not shown) and a plurality of subsidiary data pads (not shown) are formed on the passivation layer 180. The subsidiary gate pads and the subsidiary data pads are connected to the gate pads and the data pads through the contact holes. The pixel electrodes 190, the subsidiary gate pads and the subsidiary data pads are preferably formed of indium zinc oxide ("IZO"). Alternatively, the pixel electrodes 190 and the subsidiary pads are made of indium tin oxide ("ITO").

To summarize, each pixel electrode 190 has the plurality of cutouts 191 and 192 for partitioning a pixel region into a plurality of domains, and the first cutouts 191 overlap the DCE 176 while the second cutouts 192 overlap the storage electrodes 133c and 133d. The DCE 176 and the first cutouts 191 are aligned such that the DCE 176 is exposed through the first cutouts 191 to be seen in front view. A TFT is connected to the DCE 176, and the pixel electrode 190 and the DCE 176 are aligned to form a storage capacitance.

Instead of providing the storage electrodes wire 131 and 133a–133d, the pixel electrodes 190 may overlap previous gate lines to form storage capacitors.

According to another embodiment of the present invention, the DCEs 176 include substantially the same layer as the gate wire 121 and 123. The portions of the passivation layer 180 on the DCEs 176 may be removed to form a plurality of openings.

The upper substrate 210 will no be described in detail.

A black matrix 220 for preventing light leakage, a plurality of red, green and blue color filters 230, and a common electrode 270 preferably made of a transparent conductor such as ITO or IZO are formed on an upper substrate 210 preferably made of transparent insulating material such glass.

A plurality of liquid crystal molecules contained in the liquid crystal layer 3 is aligned such that their director is perpendicular to the lower and the upper substrates 110 and 210 in absence of electric field. The liquid crystal layer 3 has negative dielectric anisotropy.

The lower substrate 110 and the upper substrate 210 are aligned such that the pixel electrodes 190 exactly match and overlap the color filters 230. In this way, a pixel region is divided into a plurality of domains by the cutouts 191 and 192. The alignment of the liquid crystal layer 3 in each domain is stabilized by the DCE 176.

Figure 4:
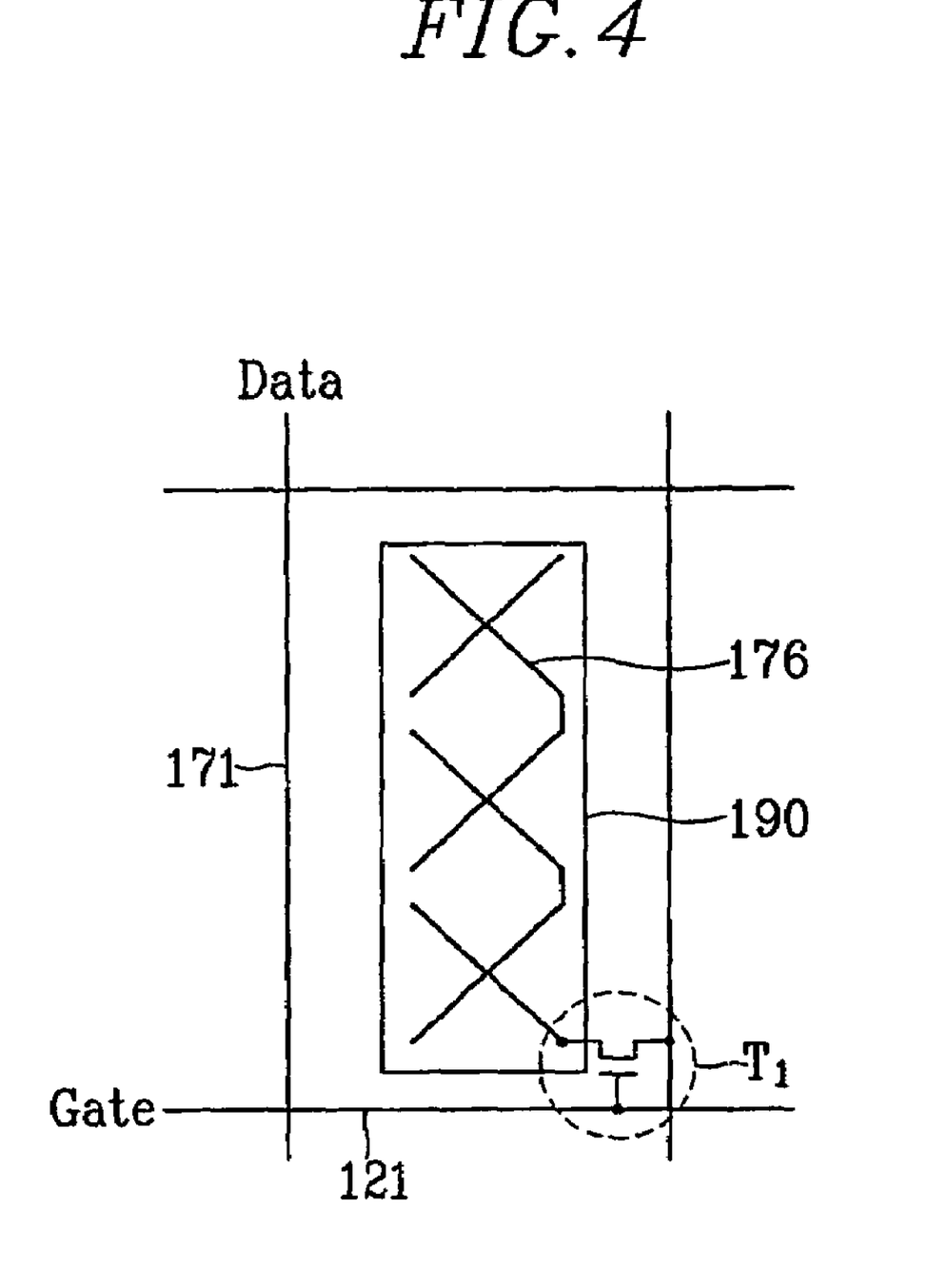
FIG. 4 is a schematic diagram of a TFT array panel for an LCD according to the first embodiment of the present invention.

FIG. 4 is a schematic diagram of the TFT array panel for the LCD shown in FIG. 3A.

As described above, only a TFT for switching the DCE 176 is provided, and a predetermined voltage is induced to the pixel electrode 190 by the capacitive coupling of the pixel electrode 190 and the DCE 176 so that the voltage difference between the pixel electrode 190 and the DCE 176 maintains constant. Consequently, stable luminance can be obtained irrespective of inversion type such as line inversion or dot inversion. Furthermore, any decrease in the aperture ratio or any increase in the load to the data line when separate TFTs for driving the pixel electrode 190 and the DCE 176 are provided can be prevented.

Figure 5:
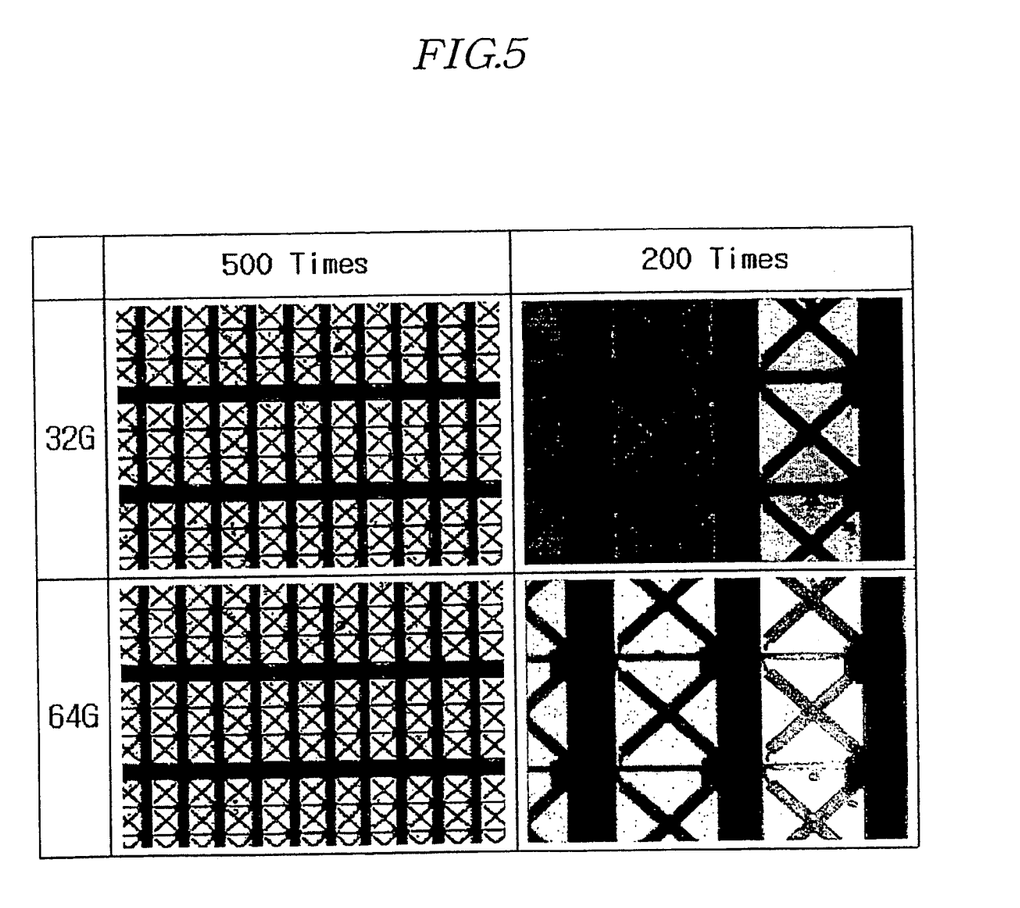
FIG. 5 is a photograph of an LCD according to the first embodiment of the present invention.

FIG. 5 is a photograph of an LCD according to the first embodiment of the present invention.

As shown in FIG. 5, the LCD exhibits an excellent display quality with decreased unstable textures.

Another embodiment of the present invention will be now described in detail.

Figure 6A:
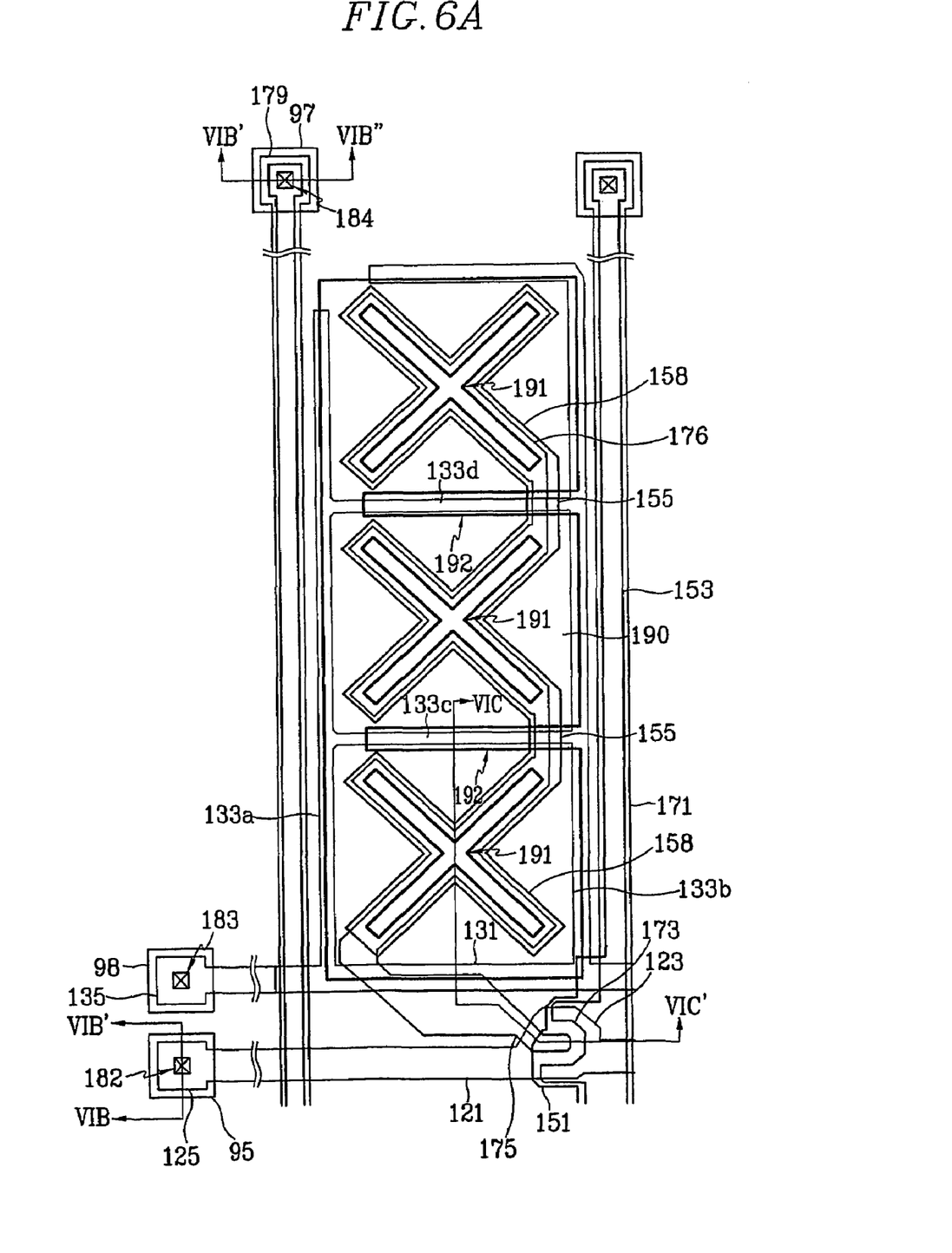
FIG. 6A is a layout view of an LCD according to a second embodiment of the present invention.
Figure 6B:
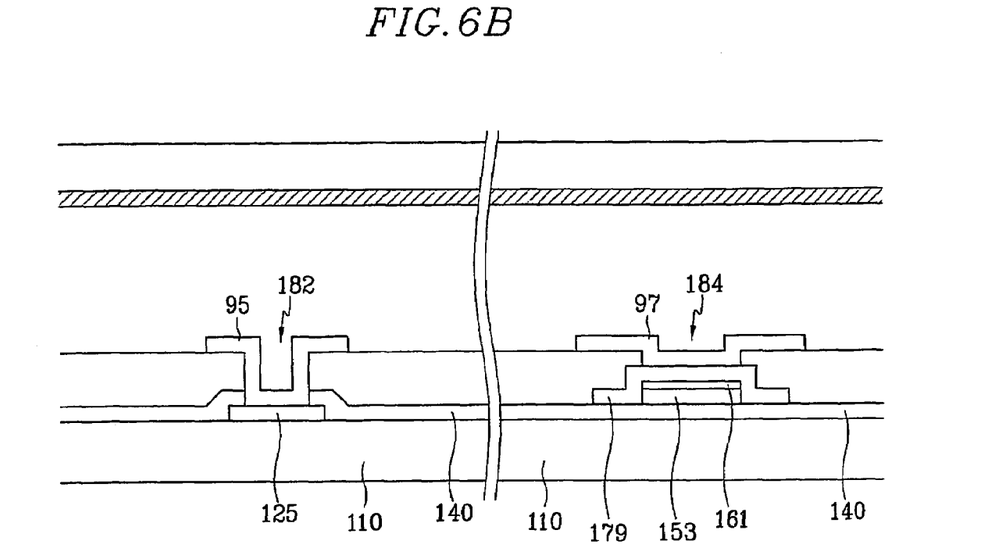
FIG. 6B is a sectional view of the LCD shown in FIG. 6A taken along the lines VIB–VIB' and the VIB'–VIB"
Figure 6C:
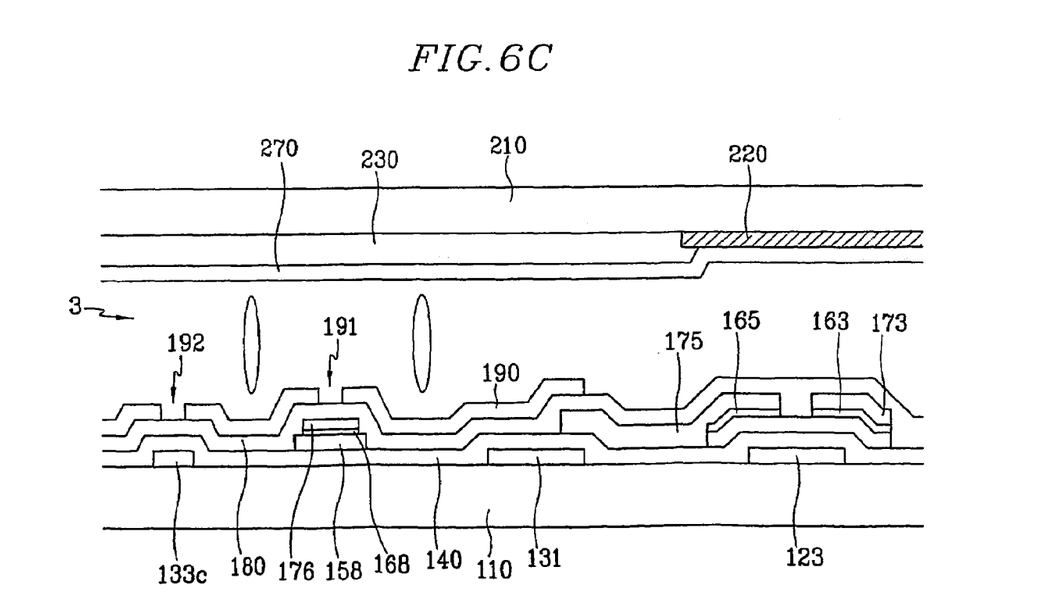
FIG. 6C is a sectional view of the LCD shown in FIG. 6A taken along the VIC–VIC'.

FIG. 6A is a layout view of an LCD according to a second embodiment of the present invention, FIG. 6B is a sectional view of the LCD shown in FIG. 6A taken along the lines VIB–VIB' and VIB'–VIB", and FIG. 6C is a sectional view of the LCD shown in FIG. 6A taken along the line VIC–VIC'.

A plurality of gate lines 121 extending substantially in a transverse direction are formed on an insulating substrate 110, and a plurality of gate electrodes 123 are branched from the gate lines 121. A plurality of gate pads 125 are formed at one ends of the gate lines 121 for connection to an external circuit. A plurality of storage electrode lines 131, a plurality of sets of first to fourth storage electrodes 133a–133d, and a plurality of storage pads 135 are also formed on the insulating substrate 110. The storage electrode lines 131 extend substantially in the transverse direction, and the first and the second storage electrodes 133a and 133b extend from the storage electrode line 131 in a longitudinal direction. The third and the fourth storage electrodes 133c and 133d extend in the transverse direction and connect the first storage electrode 133a and the second storage electrode 133b. The storage pads 135 are formed at one ends of the storage electrode lines 131.

The gate wire 121, 123 and 125 and the storage electrode wire 131, 133a–133d and 135 are preferably made of Al, Cr or their alloys, Mo or Mo alloy. If necessary, the gate wire 121, 123 and 125 and the storage electrode wire 131, 133a–133d and 135 include a first layer preferably made of Cr or Mo alloys having excellent physical and chemical characteristics and a second layer preferably made of Al or Ag alloys having low resistivity.

A gate insulating layer 140 is formed on the gate wire 121, 123 and 125 and the storage electrode wire 131, 133a–133d and 135.

A semiconductor layer 151, 153, 155 and 158 preferably made of amorphous silicon is formed on the gate insulating layer 140 opposite the gate electrodes 123. The semiconductor layer 151, 153, 155 and 158 includes a plurality of channel semiconductors 151 forming channels of TFTs, a plurality of data-line semiconductors 153 located under the data lines 171, a plurality of intersection semiconductors 155 located near the intersections of DCEs 176 and the storage electrodes 133c and 133d for ensuring insulation therebetween, and a plurality of DCE semiconductors 158 located under DCEs 176.

An ohmic contact layer 161, 165 and 168 preferably made of silicide or n+ hydrogenated amorphous silicon heavily doped with n type impurity is formed on the semiconductor layer 151, 153, 155 and 158.

A data wire 171, 173, 175 and 179 is formed on the ohmic contact layer 161, 165 and 168 and the gate insulating layer 140. The data wire 171, 173, 175 and 179 includes a plurality of data lines 171 extending in the longitudinal direction and intersecting the gate lines 121 to form a plurality of pixels, a plurality of source electrodes 173 branched from the data lines 171 and extending onto portions 163 of the ohmic contact layer, a plurality of data pads 179 connected to one ends of the data lines 171 and receiving image signals from an external device, and a plurality of drain electrodes 175 disposed on portions 165 of the ohmic contact layer, located opposite the source electrodes 173 with respect to the gate electrodes 123, and separated from the source electrodes 173.

A plurality of DCEs 176 are formed in the pixel areas defined by the intersections of the gate lines 121 and the data lines 171. Each DCE 176 includes a plurality of X-shaped metal pieces connected to one another and is connected to the drain electrode 175. The data wire 171, 173, 175 and 179 and the DCEs 176 ate preferably made of Al, Cr or their alloys, Mo or Mo alloy. If necessary, the data wire 171, 173, 175 and 179 and the DCEs 176 include a first layer preferably made of Cr or Mo alloys having excellent physical and chemical characteristics and a second layer preferably made of Al or Ag alloys having low resistivity.

A passivation layer 180 preferably made of silicon nitride or organic insulator is formed on the data wire 171, 173, 175 and 179.

The passivation layer 180 is provided with a plurality of contact holes 184 exposing the data pads 179, and the passivation layer 180 and the gate insulating layer 140 are provided with a plurality of contact holes 182 and 183 exposing the gate pads 125 and the storage pads 135, respectively. The contact holes 182, 183 and 184 exposing the pads 125, 135 and 179 may have various shapes such as polygon or circle. The area of the contact hole is preferably equal to or larger than 0.5 mm×15 μm and not larger than 2 mm×60 μm.

A plurality of pixel electrodes 190 are formed on the passivation layer 180. Each pixel electrode 190 is electrically floating and has a plurality of X-shaped cutouts 191 and a plurality of linear cutouts 192. The X-shaped cutouts 191 overlap the X-shaped portions of the DCE 176 while the linear cutouts 192 overlap the third and the fourth storage electrodes 133c and 133d. The DCE 176 broadly overlaps peripheries of the cutouts 191 as well as the cutouts 191 themselves to form a storage capacitance along with the pixel electrode 190.

Furthermore, a plurality of subsidiary gate pads 95, a plurality of subsidiary storage pads 98, and a plurality of subsidiary data pads 97 are formed on the passivation layer 180. The subsidiary gate pads 95, the subsidiary storage pads 98, and the subsidiary data pads 97 are connected to the gate pads 125, the storage pads 135, and the data pads 179 through the contact holes 182, 183 and 184, respectively. The pixel electrodes 190, the subsidiary gate pads 95, the subsidiary storage pads 98, and the subsidiary data pads 97 are preferably formed of indium zinc oxide ("IZO"). Alternatively, the pixel electrodes 190 and the subsidiary pads 95, 97 and 98 are made of indium tin oxide ("ITO").

To summarize, each pixel electrode 190 has the plurality of cutouts 191 and 192 for partitioning a pixel region into a plurality of domains, and the first cutouts 191 overlap the DCE 176 while the second cutouts 192 overlap the storage electrodes 133c and 133d. The DCE 176 and the first cutouts 191 are aligned such that the DCE 176 is exposed through the first cutouts 191 to be seen in front view. A TFT is connected to the DCE 176, and the pixel electrode 190 and the DCE 176 are aligned to form a storage capacitance.

Instead of providing the storage electrodes wire 131, 133a–133d and 135, the pixel electrodes 190 may overlap previous gate lines to form storage capacitors.

According to another embodiment of the present invention, the DCEs 176 include substantially the same layer as the gate wire 121, 123 and 125. The portions of the passivation layer 180 on the DCEs 176 may be removed to form a plurality of openings.

The upper substrate 210 will no be described in detail.

A black matrix 220 for preventing light leakage, a plurality of red, green and blue color filters 230, and a common electrode 270 preferably made of a transparent conductor such as ITO or IZO are formed on an upper substrate 210 preferably made of transparent insulating material such glass.

A plurality of liquid crystal molecules contained in the liquid crystal layer 3 is aligned such that their director is perpendicular to the lower and the upper substrates 110 and 210 in absence of electric field. The liquid crystal layer 3 has negative dielectric anisotropy.

The lower substrate 110 and the upper substrate 210 are aligned such that the pixel electrodes 190 exactly match and overlap the color filters 230. In this way, a pixel region is divided into a plurality of domains by the cutouts 191 and 192. The alignment of the liquid crystal layer 3 in each domain is stabilized by the DCE 176. In addition, the second embodiment provides a semiconductor 158 under the DCE 176 such that the distance between the DCE 176 and the common electrode 270 is reduced to increase the capacitance $C_{DC}$, and the cell gap on the DCE 176, which forms a boundary of a domain, is smaller than the cell gap on the other areas, thereby physically determining the domain boundary to make domains more stable.

Still another embodiment of the present invention will be now described.

Figure 7A:
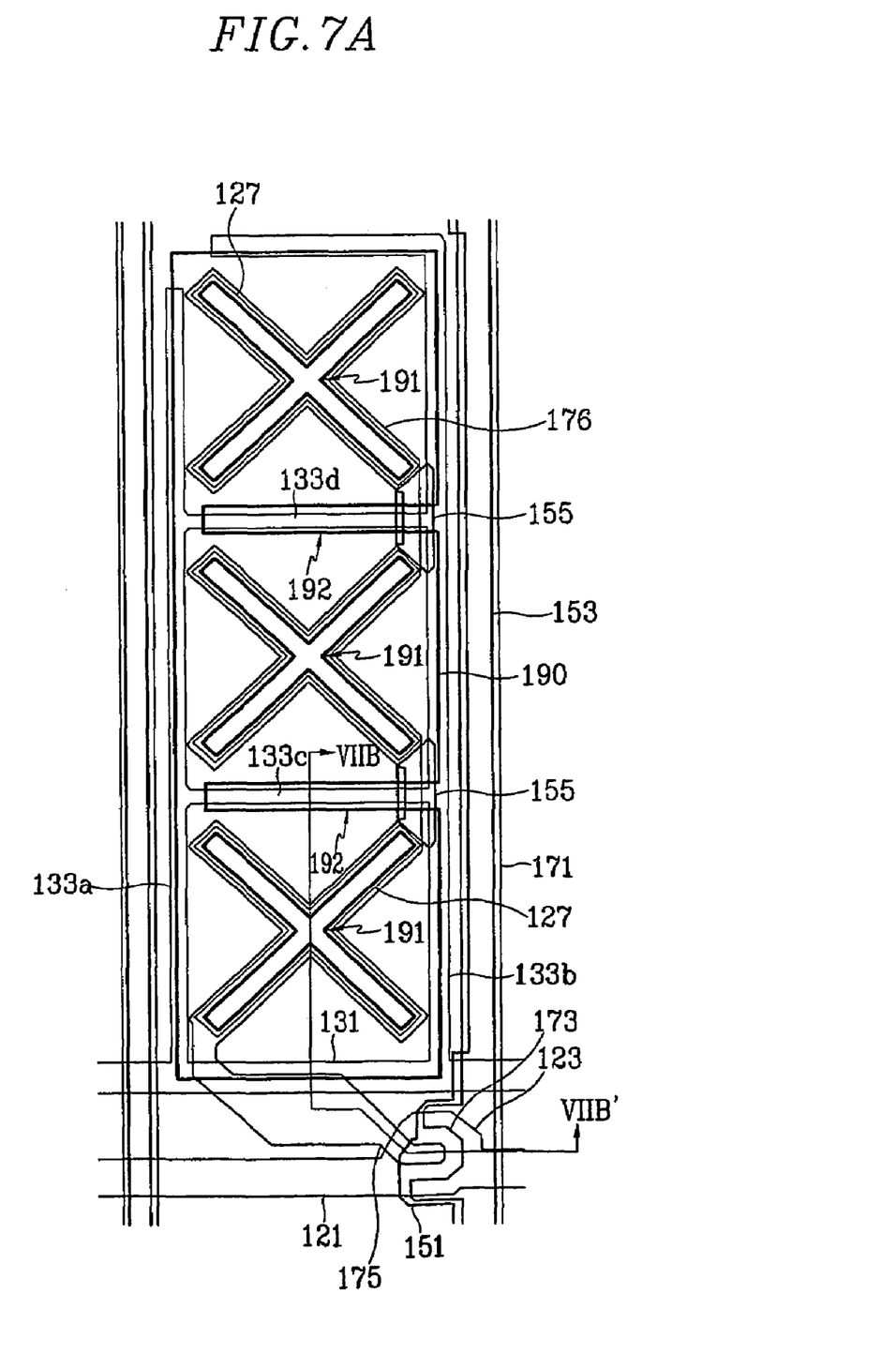
FIG. 7A is a layout view of an LCD according to a third embodiment of the present invention.
Figure 7B:
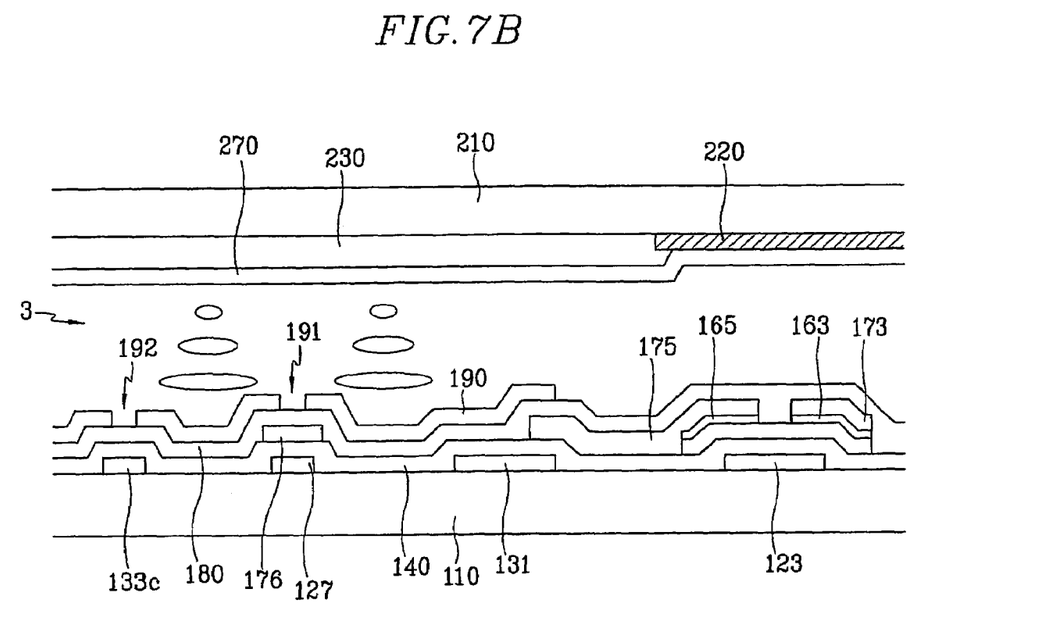
FIG. 7B is a sectional view of the LCD shown in FIG. 7A taken along the line VIIB–VIIB'.

FIG. 7A is a layout view of an LCD according to a third embodiment of the present invention, and FIG. 7B is a sectional view of the LCD shown in FIG. 7A taken along the line VIIB–VIIB'.

An LCD according to the third embodiment of the present invention has substantially the same configuration as that according to the first embodiment except that a plurality of X-shaped metallic pieces 127 are additionally formed under a plurality of DCEs 176, and liquid crystal molecules are aligned parallel to substrates 110 and 210 and has a positive dielectric anisotropy.

The X-shaped metallic pieces 127 is formed of the same layer and the same material as a gate wire 121 and 123 and the storage electrode wire 131 and 133a–133d. The X-shaped metallic pieces 127 reduces the distance between the DCE 176 and the common electrode 270 to increase the capacitance $C_{DC}$, and the cell gap on the DCE 176, which forms a boundary of a domain, is smaller than the cell gap on the other areas, thereby physically determining the domain boundary to make domains more stable. Liquid crystal molecules of a liquid crystal having positive dielectric anisotropy change their orientations in response to a force raising them vertical to the substrates 110 and 210 when an electric field is applied between the pixel electrode 190 and the common electrode 270. In order to realize a normally black mode using such a liquid crystal, the polarizing axes of the polarizing plates disposed on outer surfaces of the upper and the lower substrates 110 and 210 are aligned parallel to each other.

As described above, a multi-domain LCD is provided with a DCE and a TFT for switching DCE signals. The DCE is capacitively coupled with a pixel electrode. In this way, the tilt directions of the liquid crystal molecules can be easily controlled, thereby obtaining stable domains.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A thin film transistor array panel comprising:
   an insulating substrate;
   a gate wire formed on the insulating substrate;
   a data wire formed on the insulating substrate and intersecting the gate wire in an insulating manner;
   a thin film transistor electrically connected to the gate wire and the data wire;
   a direction control electrode electrically connected to a terminal of the thin film transistor;
   a pixel electrode electrically insulated from the direction control electrode and having a cutout, wherein the cutout substantially coinciding with the configuration of the direction control electrode; and
   a metallic piece formed of the same layer as the gate wire and placed under the direction control electrode, wherein the metallic piece substantially coincides with the configuration of the direction control electrode.

2. The thin film transistor array panel of claim 1, further comprising a storage electrode wire intersecting the data wire and forming a storage capacitor in association with the pixel electrode.

3. A thin film transistor array panel comprising:
an insulating substrate;
a gate wire formed on the insulating substrate and including a gate electrode and a gate line;
a gate insulating layer formed on the gate wire;
a semiconductor layer formed on the gate insulating layer;
a data wire including a data line formed on the semiconductor layer and intersecting the gate line, a source electrode connected to the data line, and a drain electrode facing source electrode;
a direction control electrode connected to the drain electrode;
a passivation layer formed on the data wire and the direction control electrode; and
a pixel electrode formed on the passivation layer with a cutout, the cutout substantially coinciding with the configuration of the direction control electrode,
wherein the semiconductor layer comprises a direction control electrode semiconductor located under the direction control electrode along the direction control electrode.

4. The thin film transistor array panel of claim 3, further comprising:
a gate pad connected to one end of the gate line;
a data pad connected to one end of the data line;
a subsidiary gate pad formed on the passivation layer and connected to the gate pad through a contact hole; and
a subsidiary data pad formed on the passivation layer and connected to the data pad through a contact hole.

5. The thin film transistor array panel of claim 3, wherein the cutout of the pixel electrode includes a plurality of X-shaped portions and a plurality of rectilinear portions, and the direction control electrode overlaps the X-shaped portions.

6. The thin film transistor array panel of claim 3, wherein the semiconductor layer further comprises a data-line semiconductor located under the data line and a channel semiconductor located under the source and the drain electrodes.

7. The thin film transistor array panel of claim 3, further comprising a metallic piece formed of the same layer as the gate wire and placed under the direction control electrode along the direction control electrode.

8. A thin film transistor array panel comprising:
an insulating substrate;
a gate wire formed on the insulating substrate and including a gate electrode and gate line;
a gate insulating layer formed on the gate wire;
a semiconductor layer formed on the gate insulating layer;
a data wire including a data line formed on the semiconductor layer and intersecting the gate line, a source electrode connected to the data line, and a drain electrode facing the source electrode;
a direction control electrode connected to the drain electrode;
a passivation layer formed on the data wire and the direction control electrode; and
a pixel electrode formed on the passivation layer with a cutout, the cutout substantially coinciding with the configuration of the direction control electrode,
wherein the semiconductor layer comprises a data-line semiconductor located under the data line and a channel semiconductor located under the source and the drain electrodes.

9. A liquid crystal display comprising:
a first insulating substrate;
a gate wire formed on the first insulating substrate;
a data wire formed on the first insulating substrate and intersecting the gate wire in an insulating manner to define a pixel area;
a direction control electrode formed in the pixel area defined by the intersection of the gate wire and the data wire;
a thin film transistor connected to the gate wire, the data wire, and the direction control electrode;
an electrically floating pixel electrode formed in the pixel area, electrically insulated from the direction control electrode connected to the thin film transistor, and having a cutout substantially coinciding with the configuration of the direction control electrode;
a second insulating substrate facing the first insulating substrate;
a common electrode formed on the second insulating substrate;
a liquid crystal layer interposed between the first substrate and the second insulating substrate; and
a metallic piece formed of the same layer as the gate wire and placed under the direction control electrode, wherein the metallic piece substantially coincides with the configuration of the direction control electrode.

10. The liquid crystal display of claim 9, wherein the liquid crystal layer has negative dielectric anisotropy and liquid crystal molecules in the liquid crystal layer are aligned perpendicular to the first and the second substrates.

11. The liquid crystal display of claim 9, wherein the liquid crystal layer has positive dielectric anisotropy and liquid crystal molecules in the liquid crystal layer are aligned parallel to the first and the second substrates.

12. The liquid crystal display of claim 9, further comprising a storage electrode wire formed on the first substrate and forming a storage capacitor in association with the pixel electrode.

13. The liquid crystal display of claim 12, wherein the common electrode and the storage electrode wire are supplied with the same voltage, and voltage difference between the pixel electrode and the common electrode $V_{PC}$ is given by:

$$V_{PC}=[(C_{DP})/(C_{DP}+C_{LC}+C_{ST})]\times V_{DC},$$

where $C_{DP}$ indicates capacitance between the direction control electrode and the pixel electrode, $C_{LC}$ indicates capacitance between the pixel electrode and the common electrode, $L_{ST}$ indicates capacitance between the pixel electrode and the storage electrode wire, and $V_{DC}$ is the voltage difference between the direction control electrode and the common electrode.

* * * * *